(No Model.)
A. SHARP.
WHEEL.
No. 524,224. Patented Aug. 7, 1894.
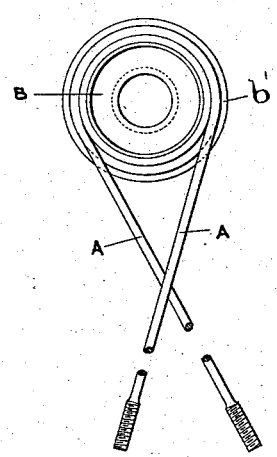
Fig. 1.
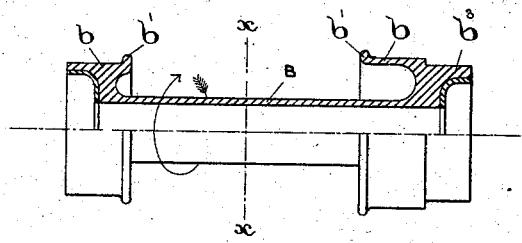
Fig. 2.
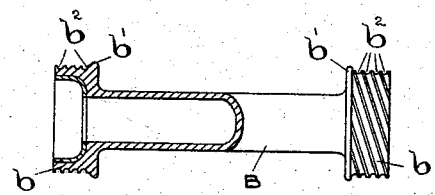
Fig. 3.
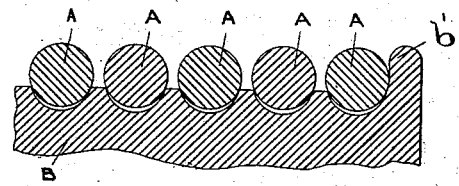
Fig. 4.
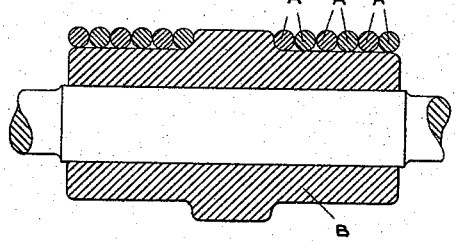
Fig. 5.
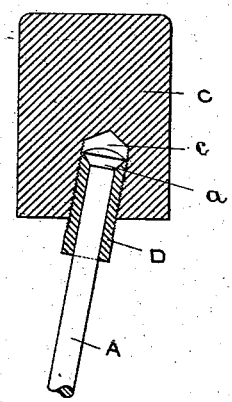
Fig. 6.
Fig. 7.
WITNESSES:
W. H. James.
INVENTOR.
Archibald Sharp.
per Robert C. Phillips.
Attorney.

UNITED STATES PATENT OFFICE.

ARCHIBALD SHARP, OF LONDON, ENGLAND.

WHEEL.

SPECIFICATION forming part of Letters Patent No. 524,224, dated August 7, 1894.

Application filed February 20, 1894. Serial No. 500,925. (No model.) Patented in England February 24, 1892, No. 3,617.

*To all whom it may concern:*

Be it known that I, ARCHIBALD SHARP, a subject of the Queen of Great Britain, residing at Chiswick, London, in the county of Middlesex, England, have invented a certain new and useful Improvement in Wheels and Pulleys, (for which I have obtained a patent in Great Britain, No. 3,617, bearing date of February 24, 1892,) of which the following is a specification.

My invention relates to the construction of wheels, pulleys and the like having tension spokes, and it consists in forming the spokes in pairs, each formed out of one piece of wire bent at the center of its length and passed round the hub of the wheel, the ends of the double spoke being fastened to the rim of the wheel by nipples in the usual manner, the object being to connect the spokes to the hub of the wheel in a more secure and effective manner than at present obtains. I attain this end in the manner shown by the accompanying drawings, in which—

Figures 1, 2, 3, and 4 are views showing the application of my invention to the construction of cycle wheels, Fig. 1 being a view in end elevation of the hub of a cycle wheel showing one of the double spokes in place thereon; Fig. 2 a longitudinal elevation of the hub of a cycle wheel—partly in section—showing the drums or enlargements on the ends of the hub to receive the spokes; Fig. 3 a longitudinal view of the hub of a cycle wheel—partly in section—showing the drums or enlargements of the hub grooved to receive the spokes, and Fig. 4 a broken view in section of an enlarged scale showing the grooves in the drums or enlargements of the hub to receive the spokes. Figs. 5, 6 and 7 are views showing the application of my invention to fly wheels or pulleys for the transmission of power, Fig. 5 being a broken view in transverse section of the hub of such a wheel showing the arrangement of the double spokes thereon, and Figs. 6 and 7 broken views in transverse section showing alternative methods of attaching the free ends of the double spoke to the rim of the wheel.

Similar letters refer to similar parts throughout the several views.

Referring to Figs. 1, 2, 3 and 4 the spokes are made in pairs, one piece of wire forming a pair of spokes. The length of wire A is bent at the center of its length to lie around the hub B of the wheel, and its ends are fastened to the rim of the wheel by nipples in the well-known manner.

The parts $b$, $b$, of the hub B around which the spokes lie may have a smooth surface as shown by Fig. 2 in which case there is a small flange $b'$ at the inner ends of the parts $b$, $b$, of the hub to keep the spokes in place. The cylindrical parts $b$ are arranged one at each end of the hub, and the looped double spokes are all of equal length. The looped portions of the spokes are arranged helically upon the said cylindrical portions, and are inclined to the right at one end of the hub and to the left at its other end. The cylindrical parts $b$ may be plain or they may be provided with helical grooves $b^2$, one for each loop. The helical grooves are preferably made of a smaller diameter than the wires of the loops so as to increase the grip of the loops upon the hub. When this construction is used for the wheels of cycles, the parts $b$, $b$, of the hub are located at or near the ends thereof, the driving wheel being formed with a prolongation $b^3$ of one of the parts $b$ to receive the driving chain wheel. As there may be a tendency in such wheels for the hub to slip relative to the spokes wound round it, I prefer to increase the frictional grip between the spokes and the hub by cutting a series of grooves in the hubs as hereinbefore described. If the direction of driving be as indicated by the arrow in the drawings the grooves in the right had side of the hub form right-handed screws, and those in the left-hand side of the hub form left-handed screws so that if slipping does take place the part of the spokes in the grooves will all move farther from the center line $x, x$, of the hub and thus the spokes will be automatically tightened, and when driving in the opposite direction the spokes will tend to ride over the flanges $b'$ $b'$, and will again be tightened.

In a cycle wheel having thirty-two spokes there will be sixteen pairs and therefore eight pairs will be wound round each part of the hub, consequently there will be right and left-handed eight threaded screws on the parts $b$ and $b$. From experiment I find that with the usual amount of tension on the spokes an arc of contact of about two-thirds of a turn on a hub without grooves of about one inch and a half diameter gives sufficient grip for a driving wheel twenty-eight inches in diameter. When the required tension has been put on the spokes the parts of the wires in contact with the hub may be brazed or soldered thereto.

Referring to Figs. 5, 6 and 7 which illustrate my invention applied to pulley wheels the spokes A are formed double and are wrapped round the hub at or near the ends thereof as hereinbefore described, or they may be arranged to lie close together at the center of the hub as shown by Fig. 5 either with or without the small flange $b'$, and as hereinbefore stated the surface of the hub on which the spokes lie may be either plain or grooved. The ends of the spokes may be attached to the rim C of the wheel either by the device illustrated by Fig. 6 which consists of a nipple D threaded externally and adapted to be screwed into a hole $c$ on the inner face of the rim C and to impinge on the headed end $a$ of the spoke and so draw it up taut, or as a modification the threaded ends $a$ of the spokes may be passed through holes $c$ in the rim of the wheel and drawn up taut by nuts D threaded on the said ends of the spokes and lying in recesses $c'$ in the outer face of the wheel rim C.

It will be obvious that one half of the ends of the spokes will leave the rim inclined to the plane of the wheel as shown by Figs. 6 and 7 and that the other half thereof will be equally inclined in the opposite direction.

Fly wheels built according to my invention can be run safely at much higher speeds than those built in the ordinary manner.

What I claim is—

1. In a wheel, the combination, with a hub having cylindrical portions $b\ b$ one at each end of it; of a series of double spokes provided with central looped portions and having their ends secured to the rim of the wheel, the said looped portions being arranged helically upon the said cylindrical portions and inclined to the right at one end and to the left at the other end of the hub, substantially as set forth.

2. In a wheel, the combination, with a hub having cylindrical portions $b\ b$ one at each end of it, the said cylindrical portions being provided with helical grooves inclined to the right at one end and to the left at the other end of the hub; of a series of double spokes having central looped portions engaging with the said helical grooves and having their ends secured to the rim of the wheel, substantially as set forth.

ARCHIBALD SHARP.

Witnesses:
 ROBERT C. PHILLIPS,
 W. H. JAMES,
*Both of 70 Chancery Lane, London, W. C.*